(12) United States Patent
Beck et al.

(10) Patent No.: US 7,264,317 B2
(45) Date of Patent: Sep. 4, 2007

(54) HYDRAULIC UNIT

(75) Inventors: Erhard Beck, Weilburg (DE); Frank Thuermer, Mainz (DE); Karl-Wilhelm Wieland, Freigericht (DE)

(73) Assignee: Continental Teves AG & Co. oHG, Frankfurt (DE)

(*) Notice: Subject to any disclaimer, the term of this patent is extended or adjusted under 35 U.S.C. 154(b) by 208 days.

(21) Appl. No.: 10/520,001

(22) PCT Filed: Jun. 28, 2003

(86) PCT No.: PCT/EP03/06880

§ 371 (c)(1),
(2), (4) Date: Dec. 29, 2004

(87) PCT Pub. No.: WO2004/005094

PCT Pub. Date: Jan. 15, 2004

(65) Prior Publication Data

US 2005/0252203 A1    Nov. 17, 2005

(30) Foreign Application Priority Data

Jul. 3, 2002    (DE) ................. 102 29 791

(51) Int. Cl.
*B60T 13/16*    (2006.01)
(52) U.S. Cl. .............. 303/10; 417/434; 303/DIG. 10
(58) Field of Classification Search .......... 303/139, 303/10, DIG. 10; 417/415, 434, 435, 440
See application file for complete search history.

(56) References Cited

U.S. PATENT DOCUMENTS 4,522,170 A * 6/1985 Lenk et al. ........... 123/198 DC
5,569,025 A * 10/1996 Bendel et al. ............. 417/434
6,113,364 A * 9/2000 Haecker et al. ........... 417/434
6,142,751 A * 11/2000 Krauter et al. ............ 417/415
6,682,325 B1 * 1/2004 Beck .......................... 417/440

FOREIGN PATENT DOCUMENTS

| DE | 42 32 205 A1 | 3/1994 |
| DE | 42 39 361 A1 | 5/1994 |
| EP | 0 304 750 A1 | 3/1989 |
| EP | 0 499 670 A1 | 2/1991 |
| EP | 0 882 632 A2 | 12/1998 |
| WO | WO 01/40042 A1 | 6/2001 |

* cited by examiner

*Primary Examiner*—Pam Rodriguez
(74) *Attorney, Agent, or Firm*—RatnerPrestia

(57) ABSTRACT

A hydraulic unit for a hydraulic regulation device, in particular for slip-controlled motor vehicle brake systems, includes several hydraulic, mechanical and/or electrically operable functional elements arranged at an accommodating member, such as accumulation elements, valve elements, pressure-generation and driving elements, and including at least one cavity associated with at least one functional element. Two connecting channels that lead into the atmosphere are provided with closing devices, which hinder the ingress of fluid into the cavity and allow ventilation of the cavity and a discharge of leakage fluid into the atmosphere. The invention permits an automatic bleeding and an automatic removal of leakage fluid independently of the spatial arrangement of the unit.

9 Claims, 3 Drawing Sheets

HYDRAULIC UNIT

TECHNICAL FIELD

The present invention relates to a hydraulic unit for a hydraulic regulation device, in particular for slip-controlled motor vehicle brake systems, comprising several hydraulic, mechanical and electrically operable functional elements arranged at an accommodating member, such as accumulation elements, valve elements, pressure-generation and driving elements, comprising several pressure fluid channels interconnecting the functional elements and capable of providing a hydraulically switchable connection between at least one pressure fluid source and one pressure fluid consumer, as well as comprising a connection to a control device for actuating the functional elements, and comprising at least one cavity associated with at least one functional element and disposing of means for bleeding.

BACKGROUND OF THE INVENTION

DE 42 39 361 A1 discloses a generic immersion-proof hydraulic unit comprising a connecting path that leads from the cavity in the direction of free ambience, and including a non-return valve that opens in the direction of an exhaust of the connecting path. In particular pumps with oscillating pump pistons produce a defined quantity of leakage fluid that can accumulate in a cavity designed as a crank chamber. The prior art unit allows the discharge of leakage fluid out of the cavity into the ambience in addition to a bleeding operation. The connecting path is isolated from the ambience in the reverse direction.

BRIEF SUMMARY OF THE INVENTION

An object of the present invention is to provide a hydraulic unit that allows the discharge of leakage fluid over the entire useful life of the vehicle in any desired mounting position in the vehicle. Another objective is to prevent the ingress of splash water, dirt, or similar contaminants into the cavity, even if a hydraulic unit heated in driving operations is fully immersed into water (immersion-proof). This is because a sudden thermal shock due to immersion of a heated hydraulic unit causes a vacuum in the air-filled cavities. Said vacuum will exert additional stress on sealing elements so that water can enter the interior of the unit when the sealing effect is fading. Salt or water that enters into the valve chamber, pump chamber, motor compartment, and pressure accumulation chamber will accumulate in and possibly flood the cavities.

The conditions described above can occur in particular in off-road vehicles, e.g. when the hydraulic unit must be arranged in the area of a wheel house due to limited mounting spaces.

This object is achieved by two connecting channels that lead into the ambience and are provided with closing devices, which hinder the ingress of fluid into the cavity and allow ventilation of the cavity and a discharge of leakage fluid into the ambience. The invention permits a pump-like discharge of leakage fluid and a pressure-compensating ventilation of the unit's interior.

Preferably, the connecting channels include closing devices, which principally adopt a closing position and alternately are movable into an open position. The valve function does not hinder the passage of media in the open condition.

According to a preferred embodiment of the invention, the closing devices are designed as non-return valves movable to adopt an open position due to a pressure difference between cavity and ambience. This permits a leakage discharge in dependence on a pneumatic pressure balance between inside space and ambience.

According to another preferred embodiment of the invention, a closing device opening in the direction of the cavity is associated with a first connecting channel so that pressure compensation in the cavity takes place due to the passage of atmospheric air. The closing device prevents air from escaping out of the cavity. Associated with a second connecting channel is a closing device, which opens in the direction of the ambience and through which air and/or leakage fluid is discharged into the ambience.

Favorably, an air-permeable and fluid-impermeable diaphragm is associated with the closing device of the first connecting channel. Said diaphragm prevents the ingress of fluid when the unit is immersed, even if a vacuum in the interior of the unit opens the closing device. The diaphragm does not hinder the passage of air for the purpose of pressure balance.

Further, it is advantageous that the air-permeable and fluid-impermeable diaphragm is arranged in front of the closing device in the forward direction.

In an embodiment of the invention favorable for the assembly, the air-permeable and fluid-impermeable diaphragm in combination with the closing device is provided as a modular unit and attached to a component of the hydraulic unit.

According to another embodiment of the invention, the connecting channels open into accommodating bores for the closing devices, said closing devices being inserted into the accommodating bores in a form-fit or frictionally engaged manner. This permits a simplified arrangement or bores in the accommodating member and a simple assembly starting from the outside surfaces of the accommodating member.

In another design of the invention, each closing device includes a supporting body with apertures for a medium as well as an attachment seat and a preferably conical sealing seat, wherein the attachment seat includes a groove into which an elastic diaphragm with a bead is mounted, and wherein a sealing lip of the diaphragm bears against the sealing seat in an elastically biased fashion. The result is that the closing device can be handled and mounted as an independent modular unit.

The need for a separate seal is obviated when the diaphragm has a cylindrical design and includes an annular outside wall for the purpose of sealing between the accommodating member and the supporting body. Besides, a guiding effect for the diaphragm is achieved when the latter includes a generally plane bottom with a central recess penetrated by a peg of the supporting body.

DETAILED DESCRIPTION OF THE PREFERRED EMBODIMENTS

Figure 5:
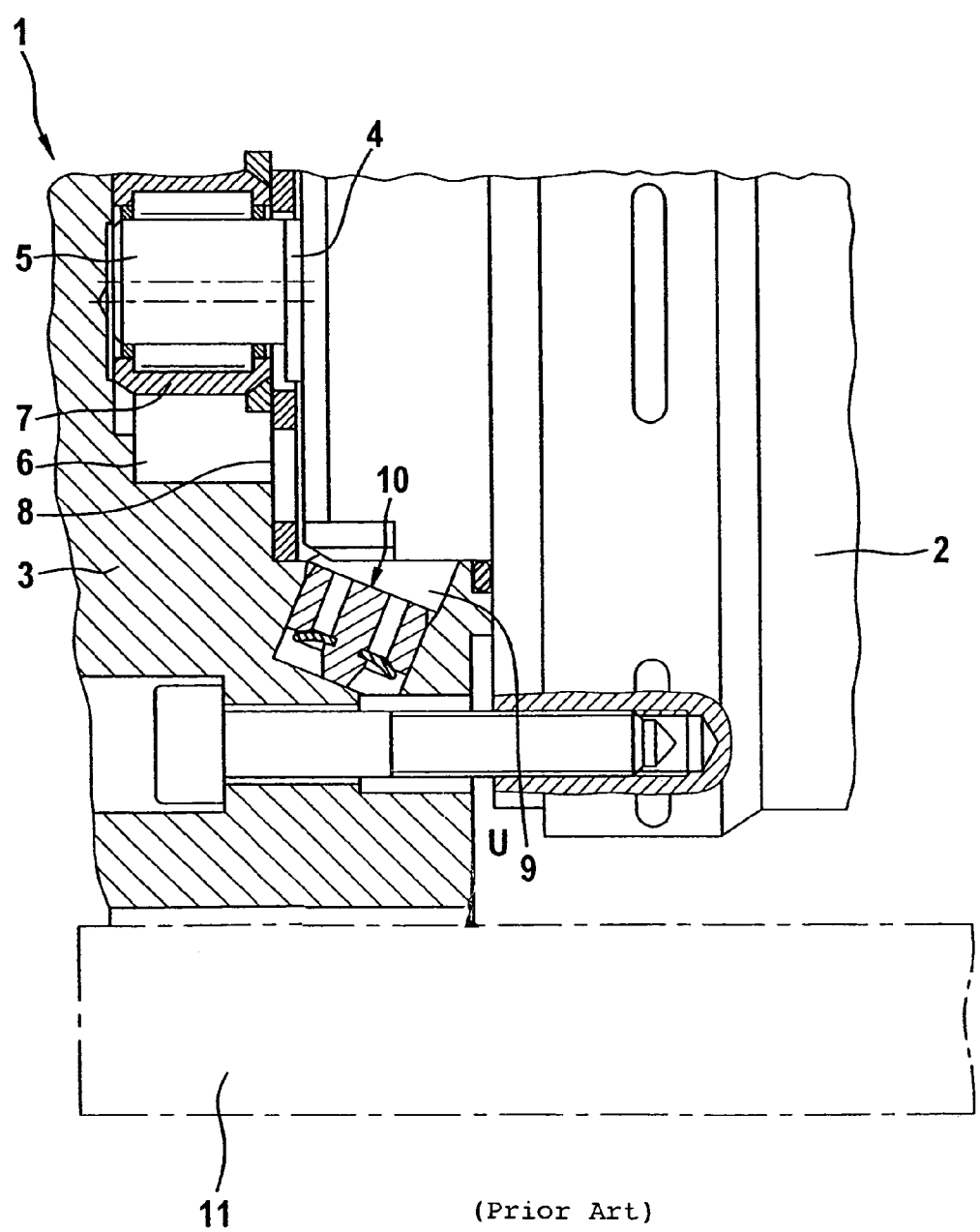
FIG. 5 is a state-of-the-art hydraulic unit according to DE 42 39 361 A1.

FIG. 5 depicts a hydraulic unit 1 for a controlled brake system comprising an electric motor 2 with a motor housing. The electric motor 2, as is apparent, is attached to an accommodating member 3 that includes several hydraulic, mechanical and electrically operable functional elements (not shown). These functional elements primarily concern accumulation elements, valve elements, and pressure generation elements, and several pressure fluid channels interconnecting the functional elements so that a switchable connection between a pressure fluid source and a pressure fluid consumer can be established. Further, an electronic control unit 11 for the valves is attached to the accommodating member 3.

An eccentric 5 arranged at a motor shaft 4 projects into an inner space of the accommodating member 3 configured as cavity 6. Said eccentric 5 is used to drive a hydraulic piston pump with oscillating pump pistons. An outside ring 7 of the bearing which is unrotatable relative to the accommodating member 3 is seated on the eccentric 5 pivoted by way of a roller bearing, said ring 7 performing an eccentric movement due to the effect of the eccentric 5. The outside ring 7 of the bearing acts on pistons (not shown), which are displaceably provided in bores in the accommodating member that are arranged vertically to the drawing plane. The outside bearing ring 7 and the eccentric 5 rotate in the cavity 6 designed as crank chamber.

Leakage fluid stripped by the pump pistons accumulates in the cavity 6, namely at the cavity's deepest point, and propagates through an opening 8 into a connecting channel 9 that leads into the ambience. A closing device 10 that opens in the direction of the ambience in the way of a non-return valve is provided in the connecting channel 9. Accumulated leakage fluid may be discharged out of the cavity 6 into the ambient atmosphere U due to an opening movement of the non-return valve. Said leakage fluid can exit reliably only if the hydraulic unit 1 is mounted in the vehicle in a mounting position exhibiting a connecting channel 9 that points downwards. If this is not the case, accumulated leakage fluid can cause higher losses.

Figure 1:
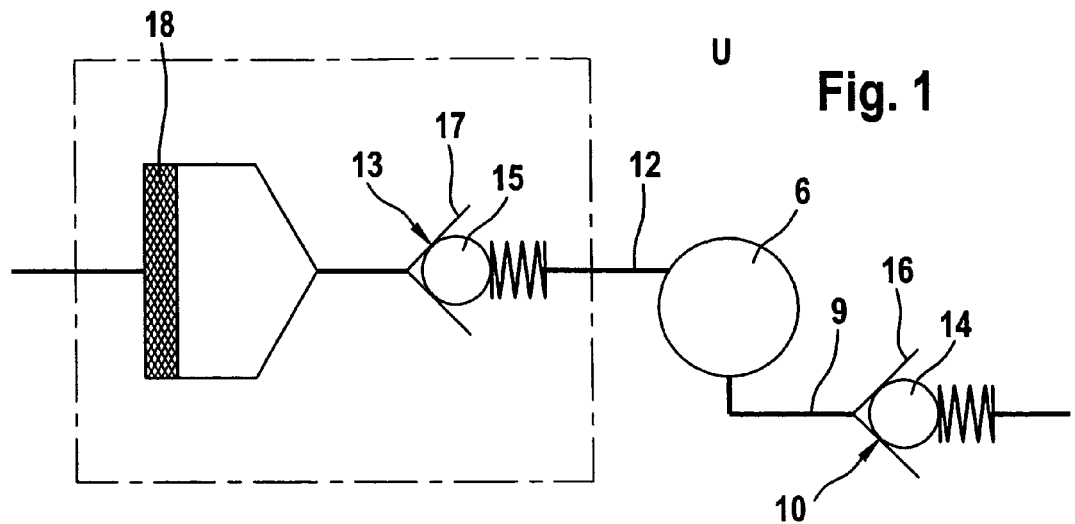
FIG. 1 shows a schematic sketch for illustrating the invention.

The basic principle of the invention can be taken from FIG. 1. Features corresponding with FIG. 5 have been designated with identical reference numerals. An air-filled cavity 6 is connected to the ambience U by way of two connecting channels 9, 12. Associated with each of the connecting channels 9, 12 is a closing device 10, 13 that principally, that means in the non-actuated condition, adopts a closing position. FIG. 1 shows in this context non-return valves that include spring-loaded closing members 14, 15 being pressed against a sealing seat 16, 17. It is clear that other elastic resetting means, in particular those according to FIG. 3 and FIG. 4, may also be provided without departing from the spirit of the invention. As can be seen, the closing devices 10, 13 are movable into an open position as a result of the difference in pressure between the ambience U and the cavity 6. As this occurs, a closing device 13 opening in the direction of cavity 6 is associated with the connecting channel 12 so that a pressure balance in the cavity 6 is possible due to the passage of atmospheric air. Associated with the connecting channel 9 is a closing device 10 which opens in the direction of the ambience U. When pressure in excess of the atmospheric pressure (in relation to the ambience) prevails in the cavity 6 and the difference in pressure is sufficient to open the closing device 10, air and possibly accumulated leakage fluid is discharged from the interior of the unit, that means, out of the cavity 6. Closure takes place automatically after the pressure balance. The connecting channel 9 can be arranged in any optional mounting position in the vehicle in consequence of the active discharge operation.

An air-permeable and fluid-impermeable diaphragm 18 is arranged in front of the closing device 13 of the connecting channel 12. Said diaphragm prevents fluid from entering the cavity 6 in the immersed condition, also when an increased water pressure prevails. On the other hand, diaphragm 18 allows pressure compensation with the ambience U should vacuum (in relation to the ambience) develop in the cavity 6, and if the effective pressure difference is sufficient to open the closing device 13.

Figure 2:
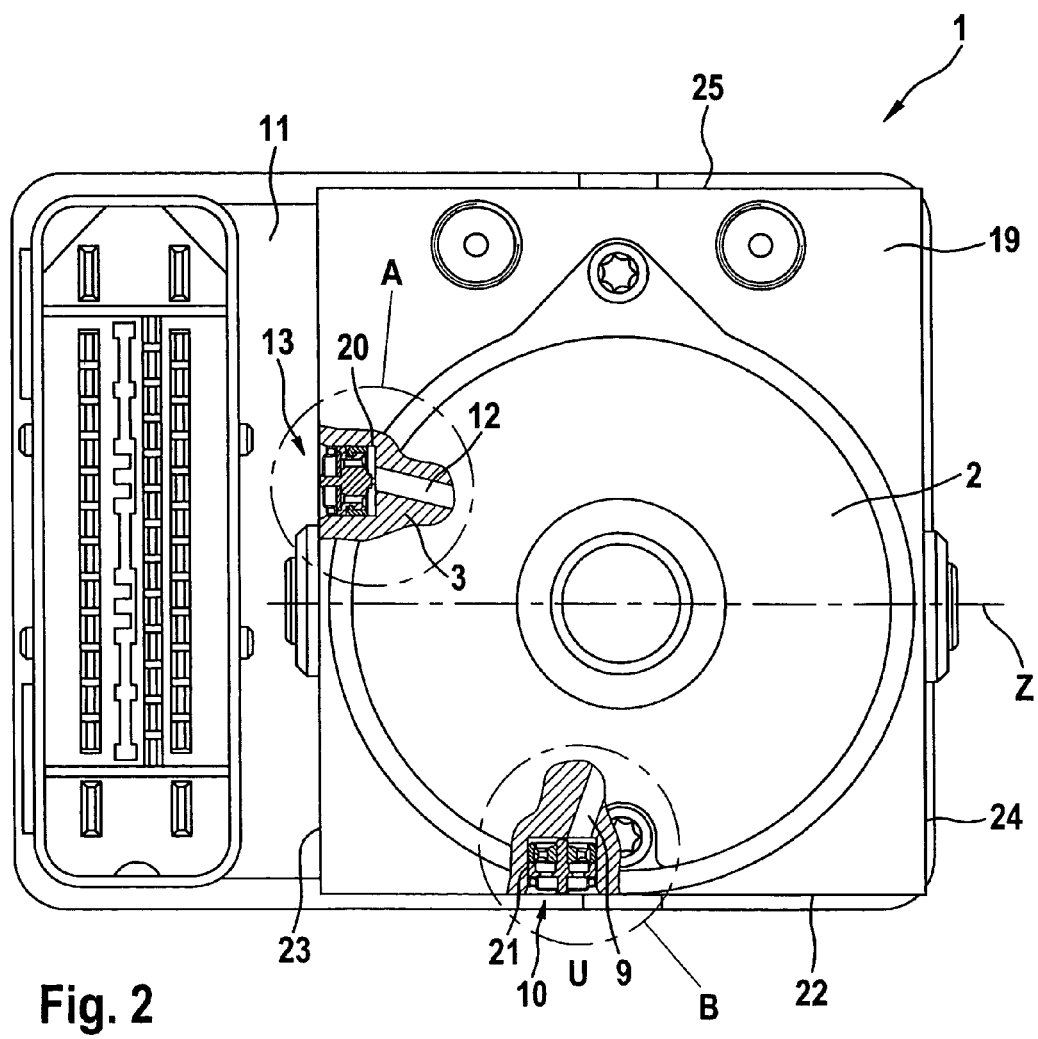
FIG. 2 is a partly cross-sectional top view of an embodiment of a hydraulic unit.
Figure 3:
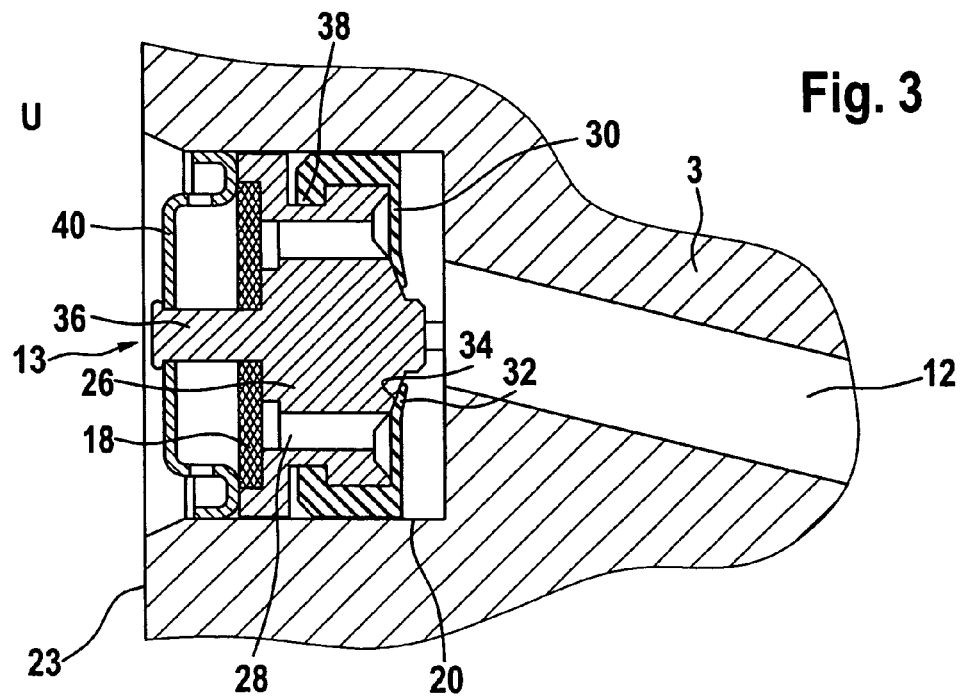
FIG. 3 is an enlarged view of the detail characterized by A in FIG. 2.
Figure 4:
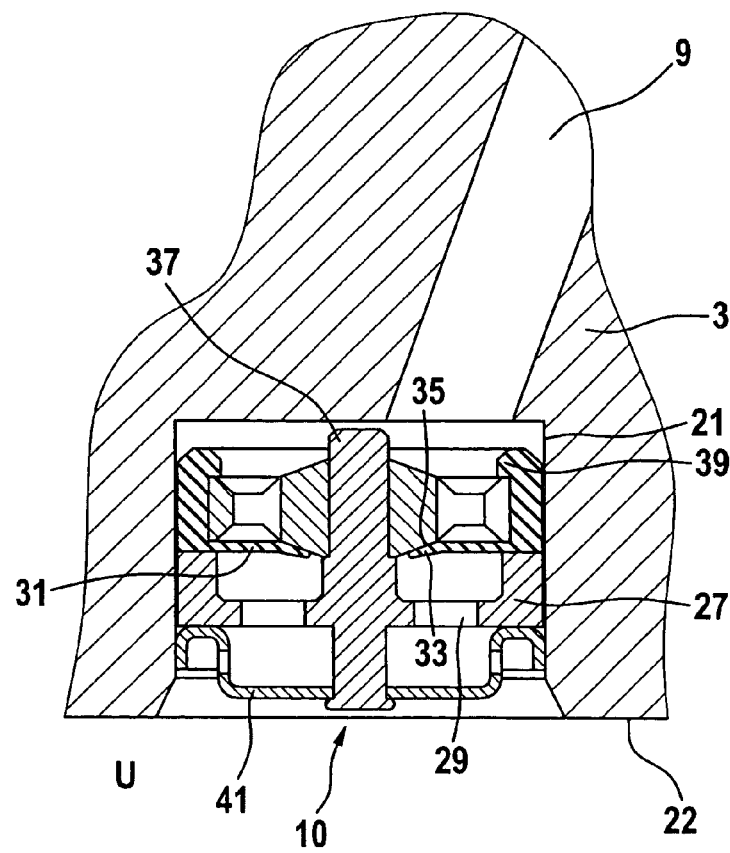
FIG. 4 is an enlarged view of the detail characterized by B in FIG. 2.

Constructive details of an embodiment of a hydraulic unit can be taken from FIGS. 2, 3 and 4. Components or features corresponding to FIGS. 1 and 5 have been assigned identical reference numerals. The motor 2 with the motor housing is attached to the top side of the accommodating member 3. A housing for an electronic control device 11 for the electromagnetically operable valves is disposed on a bottom side opposite to the top side. A plug terminal is used to connect the control device 11 to an electric/electronic wiring system for communication and current supply purposes. The current supply of the motor extends through the accommodating member. If the motor 2 is not sealed completely with respect to the accommodating member 3, the cavity 6 communicates with an inner space of the motor 2. This communication may e.g. take place through a small radial gap between a brush holder plate (not shown) and the motor shaft 4.

The connecting channels 9, 12 shown only partly in FIG. 2 respectively open with one end into the cavity 6 and with another end into accommodating bores 20, 21 for the closing devices 10, 13. Both connecting channels 9, 12 are placed in one plane with a preferably continuous bore for the pump pistons. Reference numeral Z designates the axis of the pump pistons in FIG. 2. A certain offset positioning of the axes of opposite bores for pump pistons, i.e. a certain offset between the pump pistons, is possible. The pistons' movements extend in parallel in each case. The connecting channels 9, 12 extend in a direction vertical to the drawing plane. Both closing devices 10, 13 are arranged in the area of different lateral surfaces 22, 23 of the accommodating member 3 provided at right angles relative to each other. When the closing devices are arranged opposite each other at opposed lateral surfaces 23, 24 or 22, 25, the connecting channels 9, 12 can be machined as a through-bore in one operating cycle. A bore extending in parallel to the axis A is especially expedient because it is possible to machine it in a processing station.

Each closing device 10, 13 is inserted from outside into the associated accommodating bore 20, 21 during assembly and attached therein in positive or operative engagement. In general, clinching of the accommodating member 3 or a clinched attachment due to the installation movement of the closing devices 10, 13 is also feasible for attachment.

FIG. 3 and FIG. 4 showing embodiments of closing devices 10, 13 of the diaphragm type will be explained in more detail in the following. Each closing device 10, 13 is designed as an independently operable modular unit and comprises a supporting body 26, 27 disposing of at least one aperture 28, 29 for a medium or a mix of media, i.e. air or an air/leakage fluid mix. Instead of a spring-biased closing member, an elastic diaphragm 30, 31 is attached to the supporting body 26, 27 and, in the non-actuated condition, bears with a sealing lip 32, 33 in an elastically preloaded fashion against a sealing seat 34, 35 close to the supporting body so that the passage of media is closed. As can be taken from the drawings, the sealing seats 34, 35 have a conical design. Each elastic diaphragm 30, 31 comprises a substantially plane bottom with a central recess through which a peg 36, 37 close to the supporting body extends for guiding purposes. As FIG. 3 shows, the elastic diaphragm 30 extends over a fastening portion of the supporting body 26 at least in part and is mounted with a bead 38 in a groove of the supporting body 26.

The closing device 13 according to FIG. 3 accommodates the diaphragm 18 on the ambience side being permeable to air yet impermeable to moisture and particles. Said diaphragm 18 is preferably made of a plastic such as PTFE in particular.

In the closing device 10 according to FIG. 4, the elastic diaphragm 31 extends over a fastening portion of the supporting body 27. A bead 39 extends over an end of the supporting body 27.

As a protection against damages, the closing devices 10, 13 respectively comprise on the outside surface a cover 40, 41 including recesses.

LIST OF REFERENCE NUMERALS 1 hydraulic unit
2 electric motor
3 acommodating member
4 motor shaft
5 ecentric
6 cavity
7 outside bearing ring
8 opening
9 connecting channel
10 closing device
11 control device
12 connecting channel
13 closing device
14 closing member
15 closing member
16 sealing seat
17 sealing seat
18 diaphram
19 diaphram
20 accommodating member
21 accommodating member
22 lateral surface
23 lateral surface
24 lateral surface
25 lateral surface
26 support body
27 support body
28 aperture
29 aperture
30 diaphram
31 diaphram
32 sealing lip
33 sealing lip
34 sealing seat
35 sealing seat
36 peg
37 peg
38 bead
39 bead
40 cover
41 cover
U ambience
Z axis

The invention claimed is:

1. A hydraulic unit for a hydraulic regulation device comprising several hydraulic, mechanical and electrically operable functional elements arranged at an accommodating member, comprising several pressure fluid channels interconnecting the functional elements and capable of providing a hydraulically switchable connection between at least one pressure fluid source and one pressure fluid consumer, as well as comprising a connection to a control device for actuating the functional elements, and comprising at least one cavity associated with at least one functional element and disposing of means for bleeding, the unit further comprising two connecting channels arranged as one through-bore through the accommodating member, the two connecting channels leading into an atmosphere and being provided with closing devices arranged opposite each other at opposite lateral surfaces of the accommodating member, which hinder the ingress of fluid into the cavity and allow ventilation of the cavity and a discharge of leakage fluid into the atmosphere.

2. The hydraulic unit as claimed in claim 1, wherein the closing devices principally adopt a closing position, and in that the closing devices alternately are movable into an open position.

3. The hydraulic unit as claimed in claim 1 wherein the closing devices principally adopt a closing position, and the closing devices alternately are movable into an open position, and wherein the closing devices are designed as non-return valves movable to adopt an open position as a result of a pressure difference between the cavity and the atmosphere.

4. The hydraulic unit as claimed in claim 1, wherein the connecting channels open into accommodating bores for the closing devices, and in that the closing devices are inserted into the accommodating bores in a form-fit or frictionally engaged manner.

5. A hydraulic unit for a hydraulic regulation device, comprising several hydraulic, mechanical and electrically operable functional elements arranged at an accommodating member, comprising several pressure fluid channels interconnecting the functional elements and capable of providing a hydraulically switchable connection between at least one pressure fluid source and one pressure fluid consumer, as well as comprising a connection to a control device for actuating the functional elements, and comprising at least one cavity associated with at least one functional element and disposing of means for bleeding, and two connecting channels arranged as one through-bore through the accommodating member, the two connecting channels leading into the atmosphere and being provided with closing devices, which hinder the ingress of fluid into the cavity and allow ventilation of the cavity and a discharge of leakage fluid into the atmosphere, the closing devices being arranged opposite each other at opposite lateral surfaces of the accommodating member, wherein one of said closing devices opening in the direction of the cavity is associated with one of said connecting channels so that pressure compensation in the cavity takes place due to the passage of atmospheric air, and wherein associated with a second connecting channel is another of said closing devices opening in the direction of the atmosphere and through which air and/or leakage fluid is discharged into the atmosphere.

6. The hydraulic unit as claimed in claim 5, wherein an air-permeable and fluid-impermeable diaphragm is associated with said closing device opening in the direction of the cavity.

7. The hydraulic unit as claimed in claim 5, having an air-permeable and fluid-impermeable diaphragm which is associated with said closing device opening in the direction of the cavity of, wherein the air-permeable and fluid-impermeable diaphragm is arranged in front of said closing device opening in the direction of the cavity in the forward direction.

8. The hydraulic unit as claimed in claim 7, wherein the air-permeable and fluid-impermeable diaphragm in combination with said closing device opening in the direction of the cavity is provided as a modular unit and is attached to a component of the hydraulic unit.

9. The hydraulic unit as claimed in claim 5, wherein said closing device opening in the direction of the atmosphere comprises a diaphragm and is positioned at the accommodating member in such a fashion that a weight of a defined quantity of accumulated leakage fluid invokes an opening movement of the diaphragm.

* * * * *